United States Patent [19]

Kobayashi et al.

[11] 4,313,156

[45] Jan. 26, 1982

[54] GATE CONTROLLING CIRCUIT FOR A THYRISTOR CONVERTER

[75] Inventors: Sumio Kobayashi, Yokohama; Tadashi Takahashi, Kawasaki; Hidetoshi Ino, Kunitachi, all of Japan

[73] Assignee: Tokyo Shibaura Denki Kabushiki Kaisha, Kawasaki, Japan

[21] Appl. No.: 82,339

[22] Filed: Oct. 5, 1979

[30] Foreign Application Priority Data

Dec. 22, 1978 [JP] Japan .................................. 53-157643

[51] Int. Cl.³ ............................................ H02H 7/125
[52] U.S. Cl. ........................................ 363/54; 363/68; 307/252 A
[58] Field of Search ......... 363/50; 307/252 A, 252 Q, 307/252 L; 363/68, 52, 53, 54

[56] References Cited

U.S. PATENT DOCUMENTS 3,881,147  4/1975  Ueda et al. .
4,100,434  7/1978  Iyotani et al. .................... 363/68 X
4,223,236  9/1980  Iyotani et al. .

FOREIGN PATENT DOCUMENTS 5123302  7/1976  Japan .

Primary Examiner—James B. Mullins
Assistant Examiner—Gene Wan
Attorney, Agent, or Firm—Oblon, Fisher, Spivak, McClelland & Maier

[57] ABSTRACT

A gate controlling circuit for a thyristor converter having an inverse bias voltage detecting circuit which detects the inverse bias voltage across a thyristor and is connected between the anode and cathode of serially connected thyristors in a thyristor valve. A gate signal to all of the thyristors is supplied when the output of the inverse bias voltage detecting circuit drops or becomes zero after all of the thyristors are turned off.

4 Claims, 5 Drawing Figures

GATE CONTROLLING CIRCUIT FOR A THYRISTOR CONVERTER

BACKGROUND OF THE INVENTION

1. Field of the Invention

This invention relates in general to a gate controlling circuit for a thyristor converter having a plurality of thyristors connected in series.

2. Description of the Prior Art

Recently, there has been employed a narrow width pulse system, wherein a gate pulse having a narrow width is supplied to each gate of a plurality of serially connected thyristors therein only at the time of firing of the thyristors.

However, in the case that the current flowing in the plurality of serially connected thyristors becomes zero during a conduction period, it is possible that a reverse voltage may be applied to both ends of the plurality of serially connected thyristors.

Since the electrical characteristics of the thyristors are not uniform, the reverse voltage applied to each thyristor may be unbalanced. When the reverse voltage is applied to the serially connected thyristors after the current flowing in the thyristors becomes zero, when a forward voltage is applied to the thyristors, especially when the period of application of the reverse voltage is extremely short, due to the different characteristics of each thyristor it may occur that some of the thyristors will be turned off while the remaining thyristors will not be turned off. In this case, the subsequently applied forward voltage is applied only across those thyristors which are turned off. Under these conditions, these turned off thyristors will be destroyed.

Therefore, it is necessary to provide a controlling circuit which produces a gate pulse applied to the gate of each of the thyristors after a reverse voltage is applied to the series connected thyristors after the current flow in the thyristors becomes zero, such that a forward voltage can then be applied to the thyristors without fear of destruction of any of the thyristors.

SUMMARY OF THE INVENTION

Accordingly, it is an object of this invention to provide a new and improved unique gate controlling circuit for a thyristor converter which does not expose one or more of the plurality of thyristors connected in series to danger such that destructive damage will not occur even if a thyristor is turned off when the remaining thyristors are conductive after a reverse voltage has been applied thereto.

Briefly, these and other objects are achieved in accordance with one aspect of this invention, by providing a gate controlling circuit for a thyristor converter which has a plurality of series-connected thyristors. The gate controlling circuit includes a reference circuit for commanding the thyristors in accordance with a predetermined sequence. A first detecting means is provided for detecting the forward bias voltage of one or more of the thyristors and a second detecting means is provided for detecting the inverse voltage of one of the thyristors. A first logical means is provided for generating a gate signal for the gate of the thyristors in accordance with outputs from the reference circuit and the first detecting means and a second logical means is provided for generating a gate signal for the gate of the thyristors in accordance with outputs from the reference circuit and the second detecting means. Means are further provided for generating a gate signal when the output of the second logical means falls.

BRIEF DESCRIPTION OF THE DRAWINGS

The exact nature of this invention, as well as other objects and advantages thereof, will be readily apparent from consideration of the following specification in connection with the drawings, in which.

DETAILED DESCRIPTION OF THE PREFERRED EMBODIMENTS

Figure 1:
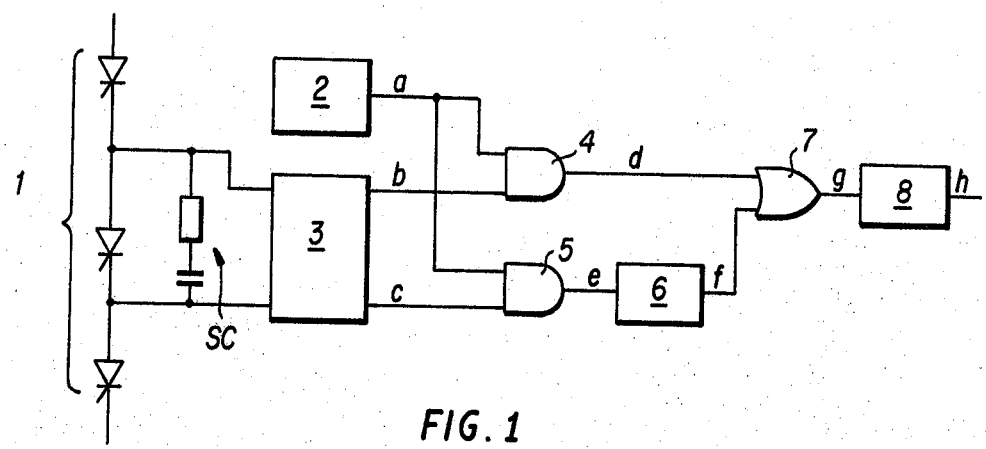
FIG. 1 shows a block diagram of a preferred embodiment of this invention.

Referring now to the drawings, wherein like reference numerals or characters designate identical or corresponding parts throughout the several views, and more particularly to FIG. 1 thereof, wherein a thyristor valve 1 is shown as including a plurality of controllable semiconductor switching elements, such as thyristors, connected in series and forming a part of a thyristor converter. The thyristor valve 1 is controlled in a predetermined sequence in response to an output "a" of a reference circuit, such as a conventional gate signal generating circuit 2.

Figure 3:
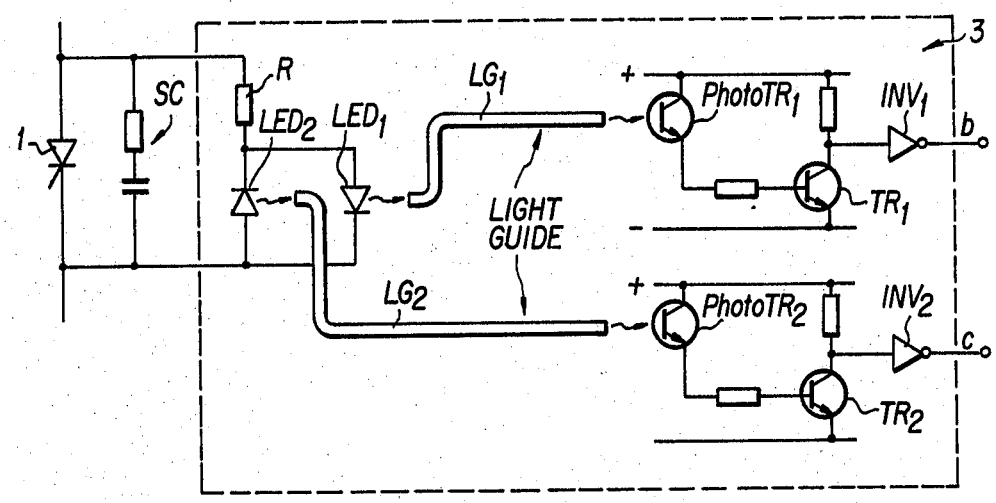
FIG. 3 illustrates a schematic diagram of the forward inverse bias voltage detecting circuit 3 shown in FIG. 1.

A forward inverse bias voltage detecting circuit 3, hereinafter designated as FIV detecting circuit and the details of which are shown in FIG. 3, is connected between the anode terminal and the cathode terminal of one or more of the thyristors of the thyristor valve 1 and connected in parallel with a conventional snubber circuit SC. Although in FIG. 3, a specified single thyristor for which both the forward and reverse voltage are detected is shown, as an example, it is possible to make the detection across the terminals of two or more serially connected thyristors. Moreover, it is possible to detect the forward and reverse voltages from individual different thyristors, respectively. The FIV detecting circuit 3 produces a forward bias voltage signal "b" which is detected when the voltage of the connected thyristor is at a forward bias voltage and produces an inverse bias voltage signal "c" which is detected when the voltage of the connected thyristor is at an inverse bias voltage.

The output "a" of the gate signal generating circuit 2 and the forward bias voltage signal "b" of the FIV detecting circuit 3 are supplied to a first AND gate 4. The output "a" and the inverse bias voltage signal "c" of the FIV detecting circuit 3 are supplied to a second AND gate 5. The second AND gate 5 produces a signal "e" which indicates that the inverse bias voltage is applied between the thyristors during the turnON period of the output "a" of the gate signal generating circuit 2.

Figure 2:
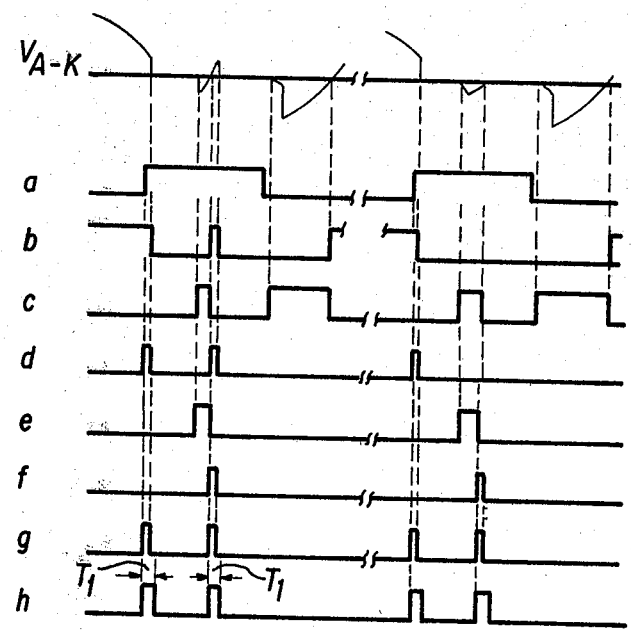
FIG. 2 is a timing diagram showing waveforms of each of the components shown in FIG. 1.

The signal "e" of the AND gate 5 is supplied to a pulse circuit 6 which produces a pulse "f" when the signal "e" drops, i.e. when the inverse bias voltage becomes zero, as shown in FIG. 2.

In FIG. 2, it is noted that the waveform $V_{A-k}$ refers to the voltage between the anode and the cathode of the detected thyristor.

A signal "d" from the first AND gate 4 and the output "f" of the pulse circuit 6 are supplied through an OR gate 7 to a gate driving circuit 8 which is connected to each gate of the thyristors of the thyristor valve 1 and produces an output "h" with a predetermined width $T_1$ in response to an output "g" of the OR gate 7.

Referring now to FIG. 3, the FIV detecting circuit 3 shown in FIG. 1 is explained in detail. The FIV detecting circuit 3 includes two LED diodes $LED_1$ and $LED_2$ which are connected through a resistor R to the thyristor valve 1. Two signal receiving circuits are further provided and each have respective photo transistors photo $Tr_1$ and photo $Tr_2$ and switching transistors $Tr_1$ and $Tr_2$ connected to the corresponding LED diodes $LED_1$ and $LED_2$ through respective light guides $LG_1$ and $LG_2$. The two signal receiving circuits serve to separate the low voltage stage, such as the controlling circuit from the high voltage stage, such as the thyristor circuit.

When the voltage of the thyristor valve 1 is at a forward bias voltage, the $LED_1$ emits light whereby the signal "b" is produced and when the voltage of the thyristor valve 1 is at an inverse bias voltage, the $LED_2$ emits light whereby the signal "c" is produced.

Figure 4:
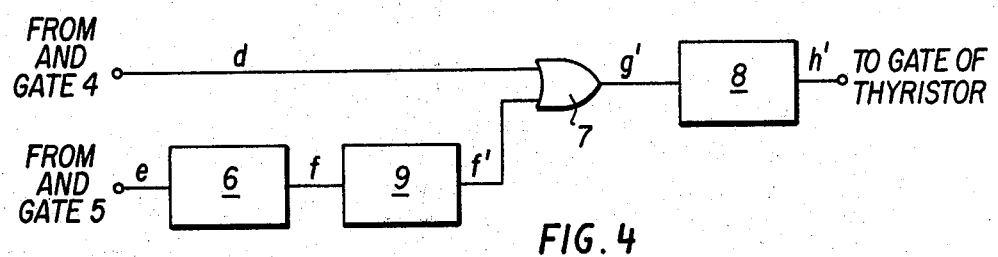
FIG. 4 shows a modification of the present invention.
Figure 5:
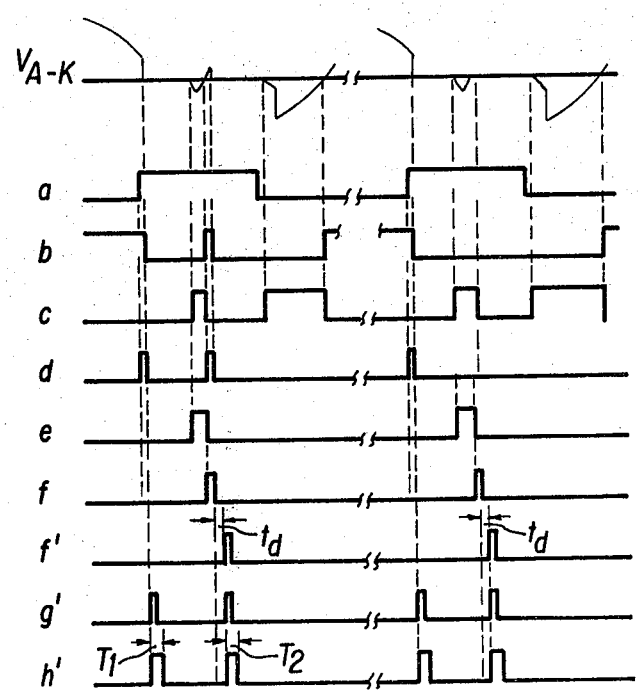
FIG. 5 is a timing diagram showing waveforms at each of the components of FIG. 4.

Referring now to FIGS. 4 and 5, a modification of the present invention is shown as having a time delay circuit 9 which is provided between the pulse circuit 6 and the OR gate 7. The time delay circuit 9 serves to protect the thyristor converter by delaying the time at an amount $t_d$ when it is possible to apply the gate signal to all of the thyristors when the forward voltage, which is easily turned ON, is applied.

The time delay circuit 9 also serves to reduce the width (from T1 to T2) of the gate pulse from the gate pulse circuit 6 and consequently, the capacity of the power supply (not shown) for gate driving.

It should now be apparent that in accordance with the teachings of this invention it is possible to prevent exposing one or more of the thyristors to danger because, even though a forward bias voltage will occur across the thyristor valve after one or more the thyristors are turned off, the gate signal is generated and supplied to all of the thyristors provided that the inverse bias voltage of the detected thyristor drops or becomes zero.

Moreover, it should now be apparent that with the present invention it is possible to prevent the problem of the prior art, namely, that the thyristors will be destroyed due to not generating pulse signal because the forward bias voltage of the thyristors which are to be detected do not detect because the turn-off time of the thyristor whose inverse voltage is to be detected is shorter than the duration of their inverse voltage.

Further, with the present invention, it is possible to safely operate the thyristor convertor with a saving of energy, since the convertor according to this invention has the advantage of using a narrow width pulse.

Obviously, many modifications and variations of this invention are possible in light of the teachings of this invention. It is therefore to be understood that within the scope of the appended claims, the invention may be practiced otherwise than as specifically described herein.

What is claimed as new and desired to be secured by Letters Patent of the United States is:

1. A gate controlling circuit for a thyristor converter which has a plurality of series-connected thyristors, said circuit comprising:

a reference circuit for commanding said thyristors in accordance with a predetermined sequence;

first detecting means for detecting the forward bias voltage of at least one of said thyristors;

second detecting means for detecting the inverse voltage of at least one of said thyristors;

first logical means for generating a gate signal for the gate of said thyristors in accordance with outputs from the reference circuit and the first detecting means;

second logical means for generating a gate signal for the gate of said thyristors in accordance with outputs from the reference circuit and the second detecting means, means for generating a gate signal when the output of the second logical means drops;

means for adding the output of said first logical means and said means for generating a gate signal when the output of the second logical means falls; and means for generating pulses for a gate of the thyristors in accordance with the output of the means for adding.

2. A gate controlling circuit according to claim 1, further comprising delay means connected to the output of the means for generating a gate signal when the output of the second logical means falls.

3. A gate controlling circuit according to claim 1 wherein said means for adding is an OR gate.

4. A gate controlling circuit according to claims 1 or 2 wherein said first and said second detecting means are light emitting diodes.

* * * * *